US011245307B2

(12) United States Patent
St. Rock et al.

(10) Patent No.: US 11,245,307 B2
(45) Date of Patent: Feb. 8, 2022

(54) ELECTRIC MOTOR ASSEMBLY

(71) Applicant: Hamilton Sundstrand Corporation, Charlotte, NC (US)

(72) Inventors: Brian St. Rock, Andover, CT (US); Matthew Robert Pearson, Hartford, CT (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 124 days.

(21) Appl. No.: 16/421,113

(22) Filed: May 23, 2019

(65) Prior Publication Data
US 2020/0373808 A1    Nov. 26, 2020

(51) Int. Cl.
*H02K 5/20* (2006.01)
*H02K 9/18* (2006.01)
*H02K 9/193* (2006.01)

(52) U.S. Cl.
CPC ............. *H02K 5/20* (2013.01); *H02K 9/18* (2013.01); *H02K 9/193* (2013.01)

(58) Field of Classification Search
CPC .. H02K 5/00; H02K 5/10; H02K 5/20; H02K 9/00; H02K 9/04; H02K 9/10; H02K 9/19; H02K 9/20; H02K 9/26; H02K 9/22
USPC ........................................ 310/52, 54, 58–65
See application file for complete search history.

(56) References Cited

U.S. PATENT DOCUMENTS

| | | | |
|---|---|---|---|
| 5,925,947 A * | 7/1999 | Kajiwara | H02K 9/18 310/58 |
| 6,685,447 B2 | 2/2004 | Mabe et al. | |
| 9,413,208 B2 | 8/2016 | Pal | |
| 9,467,023 B2 | 10/2016 | Pal | |
| 2003/0075996 A1 * | 4/2003 | Yoshida | H02K 1/20 310/58 |

(Continued)

FOREIGN PATENT DOCUMENTS

| | | | |
|---|---|---|---|
| EP | 0776081 A1 | 5/1997 | |
| EP | 1976098 A2 | 10/2008 | |

(Continued)

OTHER PUBLICATIONS

Extended European search report issued in corresponding EP application No. 19213139.9, dated Jun. 24, 2020.

*Primary Examiner* — Tran N Nguyen
(74) *Attorney, Agent, or Firm* — Locke Lord LLP; Scott D. Wofsy; Georgi Korobanov

(57) ABSTRACT

A fan motor housing including a circumferential motor housing having a radially outer surface and a radially inner surface and defining a primary axis including a first plurality of concentric flow channels disposed between the radially outer surface the radially inner surface, wherein the concentric flow channels extend in an axial direction parallel to the primary axis, a second plurality of concentric flow channels disposed between the radially outer surface and the radially inner surface, extending in an axial direction parallel to the primary axis, wherein the first and second pluralities of concentric flow channel are thermodynamically connected, a first plurality of radial conduits connecting the second plurality of flow channels to the radially inner surface of the motor housing, and a second plurality of radial conduits connecting the radially inner surface of the motor housing to the second plurality of flow channels.

13 Claims, 4 Drawing Sheets

(56) References Cited

U.S. PATENT DOCUMENTS

2016/0352201 A1  12/2016  Ranjan et al.
2018/0278125 A1   9/2018  Huang et al.

FOREIGN PATENT DOCUMENTS

| EP | 2752976 | A2 |   | 7/2014 |
|----|---------|----|---|--------|
| EP | 3484026 | A1 |   | 5/2019 |
| FR | 446921  | A  |   | 12/1912 |
| FR | 1349625 |    | * | 1/1964 |
| FR | 1349625 | A  |   | 1/1964 |
| JP | 2006246603 | A |   | 9/2006 |

\* cited by examiner

Fig. 6
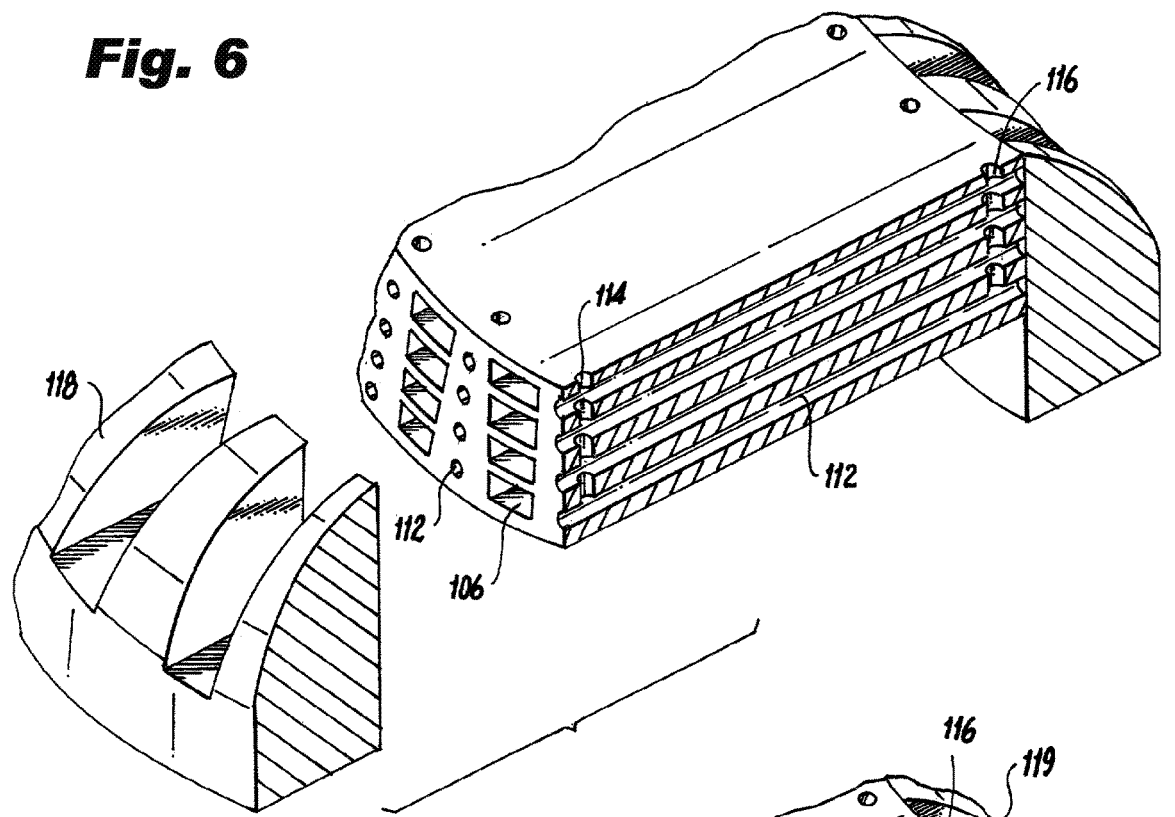
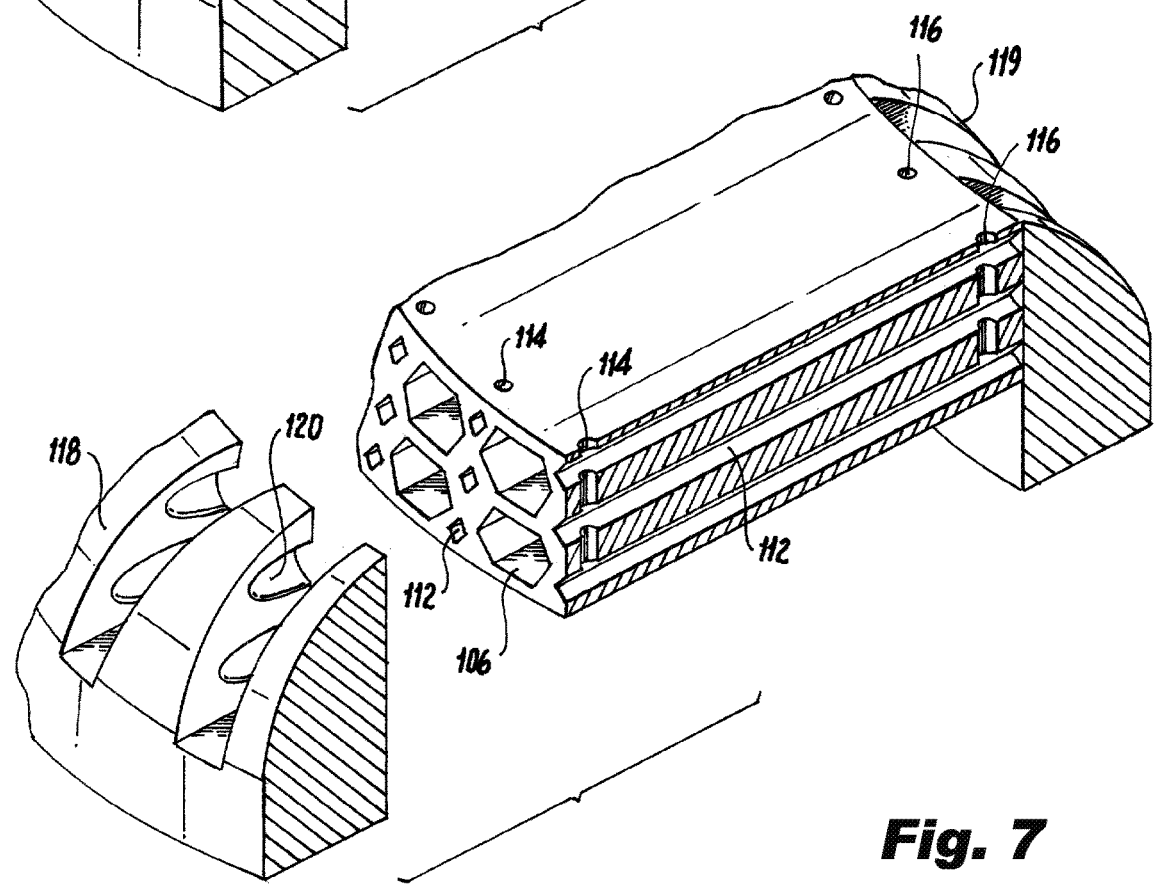
Fig. 7

ELECTRIC MOTOR ASSEMBLY

BACKGROUND

Technological Field

The present disclosure relates to electric motor cooling, and more particularly to using an integrated motor cooler.

Description of Related Art

Electric motors require significant external components and plumbing to provide a cooling solution. The true metric of "power density" for aircraft propulsion systems include all ancillary systems that support motor operation including the pumps, heat exchangers, and pipes of an external cooling system plus the associated drag/weight penalty they create. The goal is to increase the power density of electric motor systems.

The conventional methods and systems have generally been considered satisfactory for their intended purpose. However, there is still a need in the art for electric motor systems having improved power density, cooling, and performance. There also remains a need in the art for such electric power system and components that are economically viable. The present disclosure may provide a solution for at least one of these remaining challenges.

SUMMARY OF THE INVENTION

A fan motor housing including a circumferential motor housing defining a primary axis, a first plurality of concentric flow channels configured to port air therethrough disposed between a radially outer surface of the motor housing and a radially inner surface of the motor housing, wherein the concentric flow channels extend in an axial direction parallel to the primary axis, a second plurality of concentric flow channels configured to port a cooling fluid therethrough disposed between a radially outer surface of the motor housing and a radially inner surface of the motor housing, extending in an axial direction parallel to the primary axis, a first plurality of conduits connecting the second plurality of flow channels to the radially inner surface of the motor housing configured to port the cooling fluid to the radially inner surface, and a second plurality of conduit connecting the radially inner surface of the motor housing to the second plurality of flow channels configured to port the cooling fluid from the radially inner surface to the second plurality of concentric flow channels.

The flow channels of the first plurality of concentric flow channels and the flow channels of the second plurality of concentric flow channels can be arranged alternatingly in a radial and circumferential direction. The fan motor housing assembly can also include a plurality of circumferentially arranged headers closing each of the channels of the second plurality of concentric channels. Each header of the plurality of circumferentially arranged headers can include a transition section configured to smooth a transition from each of the headers to the first plurality of concentric flow channels. The plurality of circumferentially arranged headers can be located proximate to an inlet side of the motor housing, and a second plurality of circumferentially arranged headers can be located proximate to an outlet side of the motor housing.

The fan motor housing assembly can also include a stator located radially inward from the inner surface of the motor housing, a rotor located radially inward from the stator, and a shaft located radially inward from the rotor, the stator being completely within the circumferential motor housing. The motor and impeller can be sealed into the housing with a seal plate. The motor housing assembly can include an impeller located within the motor housing configured for drawing the cooling fluid from the second plurality of concentric flow channels. A circumferential channel can separate the stator and the inner surface of the motor housing.

A method of cooling a fan motor is also disclosed. The method includes operating an electric motor within a motor housing, driving a propeller by the electric motor, driving propeller air through a first axially extending channel within the motor housing, driving a fluid through a second axially extending channel within the motor housing, cooling the fluid, driving the fluid from the second axially extending channel into a cavity defined by an inner surface of the motor housing to cool components contained therein, and driving the fluid from the cavity to the second axially extending channel.

An impeller can be driven by the electric motor to draw the fluid from the second circumferential channel to an inner surface of the motor housing. The fluid used for cooling can be air or oil.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject invention appertains will readily understand how to make and use the devices and methods of the subject invention without undue experimentation, preferred embodiments thereof will be described in detail herein below with reference to certain figures, wherein:

FIG. 6 is a perspective view of a portion of the assembly of FIG. 1, showing a separated header; and FIG. 7 is a perspective view of a portion of the assembly of FIG. 1, showing an embodiment with separated headers.

DETAILED DESCRIPTION

Figure 1:
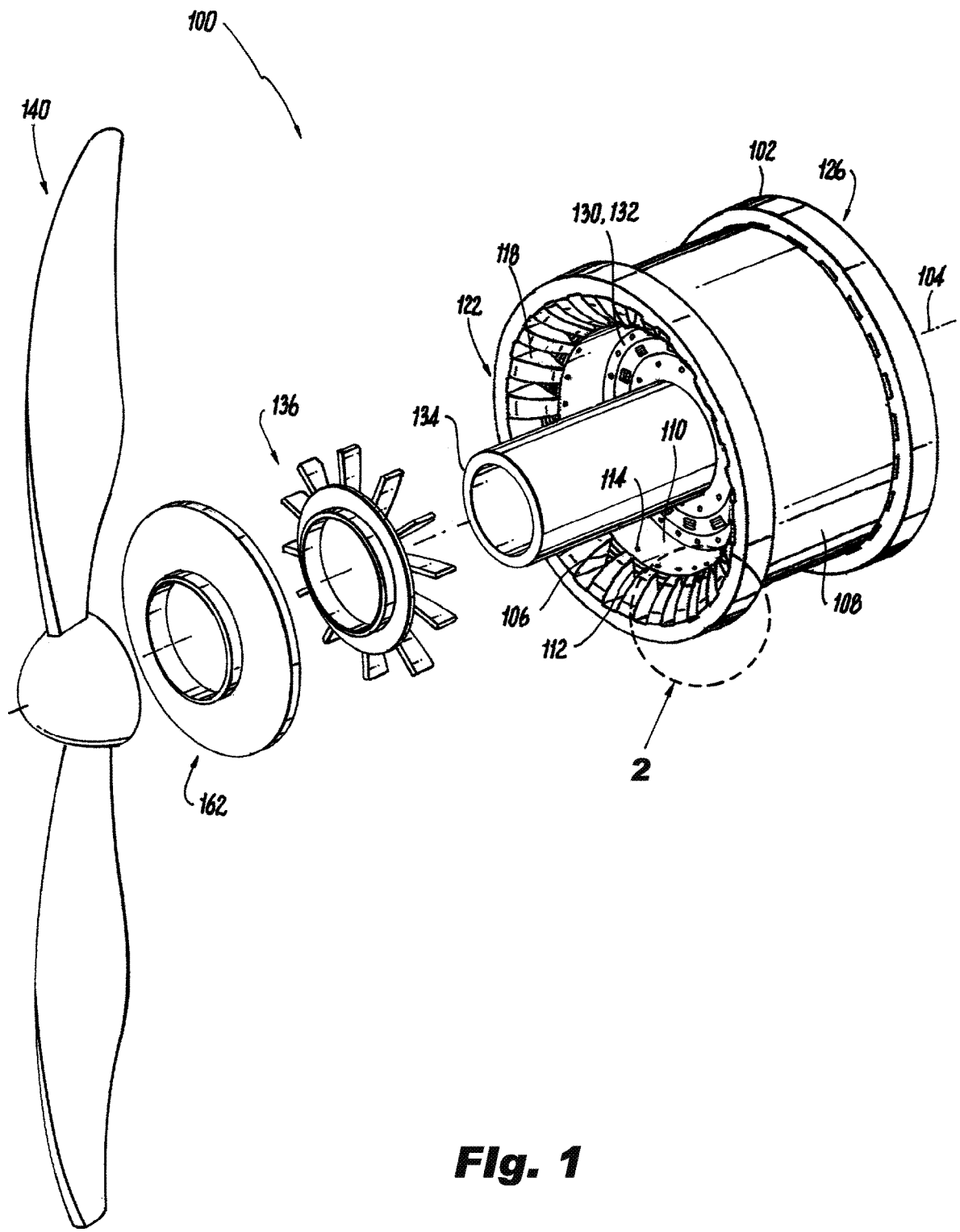
FIG. 1 is a perspective view of a fan motor assembly.

Reference will now be made to the drawings wherein like reference numerals identify similar structural features or aspects of the subject invention. For purposes of explanation and illustration, and not limitation, a partial view of an exemplary embodiment of a fan motor assembly in accordance with this disclosure is shown in FIG. 1 and is designated generally by reference character 100. Other embodiments of fan motor assembly in accordance with the invention, or aspects thereof, are provided in FIG. 2-7, as will be described. The methods and systems of this disclosure can be used to eliminate auxiliary pumps and ram-circuit heat exchangers. The associated weight and drag of the overall system can be decreased. The overall electric propulsion system power density can also be increased. The system can also greatly simplify motor integration by eliminating need for a co-designed external cooling system.

Referring to FIG. 1, a fan motor housing assembly 100 includes a circumferential motor housing 102 defining a primary axis 104, a first plurality of concentric flow channels 106 configured to port air therethrough disposed between a radially outer surface 108 of the motor housing and a radially inner surface 110 of the motor housing, wherein the concentric flow channels 106 of the first plurality extend in an axial direction parallel to the primary axis 104. A second plurality of flow channels 112, extended axially, configured to port a cooling fluid therethrough are disposed between the radially outer surface 108 of the motor housing and the radially inner surface of the motor housing 110, extend in an axial direction parallel to the primary axis 104. A first plurality of radially extended conduits 114 connect the second plurality of flow channels 112 to the radially inner surface 110 of the motor housing in order to port the cooling fluid to the radially inner surface 110. A second plurality of radially extended conduits 116 (shown in FIGS. 6 and 7) connect the radially inner surface 110 of the motor housing 102 to the second plurality of flow channels 112 in order to port the cooling fluid from the radially inner surface 110 back to the second plurality of flow channels 112 within the housing 102. As air from the propeller 140 is driven through the channels of the first plurality 106 the air cools the fluid being ported through the first plurality of conduits 114. The cooled fluid is pumped from the first plurality of conduits 114 which are arranged circumferentially, to either an inner cavity 138 (shown in FIG. 4) of the motor housing 102, or directly into the motor's stator and rotor 130/132 and then into the second plurality of conduits 116, which are also arranged circumferentially about the motor housing 102. The cooling fluid is sealed within the housing 102, by seal plate 162, and recirculates through the aforementioned channels (112, 114, 130/132, 138, and 116) during operation. It is also considered that the propeller could be a ram fan or cabin-air compressor.

Figure 2:
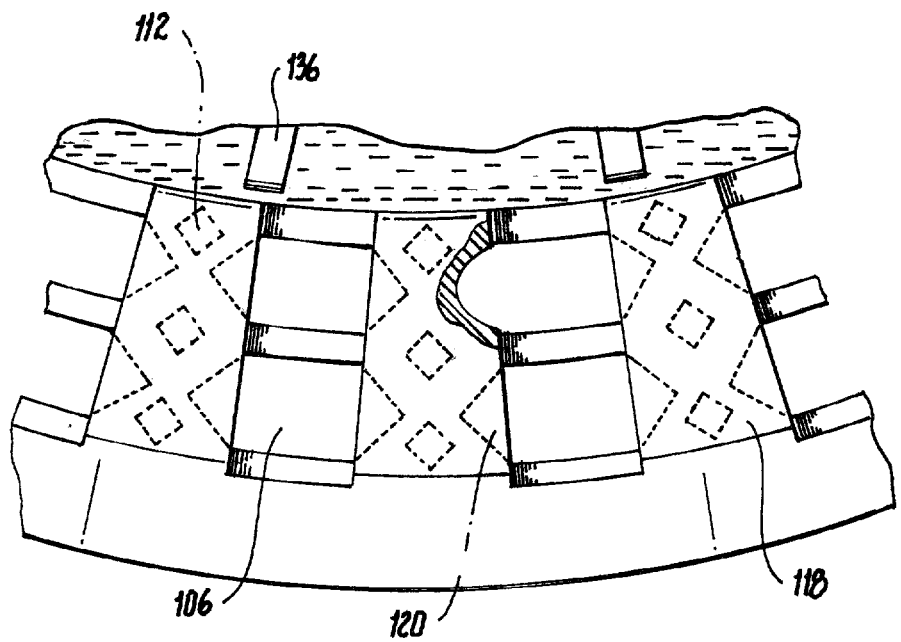
FIG. 2 is a sectional front view of a portion of the assembly of FIG. 1, showing circumferential flow channels and interaction with the impeller.

FIG. 2 shows, the first plurality of concentric flow channels 106 and the second plurality of flow channels 112 arranged alternatingly in radial and a circumferential directions, akin to a checkerboard. A plurality of circumferentially arranged headers 118 and 119 (shown in FIGS. 4 and 5) seal each of the channels of the second plurality of channels 112. The headers 118 are located proximate to an inlet side 122 of the motor housing and the second plurality 119 of circumferentially arranged headers are located proximate to an outlet side 126 of the motor housing. The headers 118 each include a transition section 120 configured to smooth and flow transition from each of the headers 118 to the first plurality of concentric flow channels 106. The transition 120 provides for a more laminar airflow transition.

Figure 3:
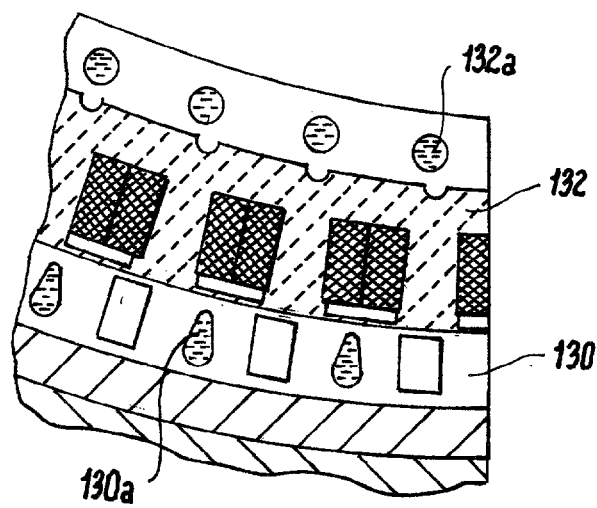
FIG. 3 is a sectional front view of a portion of the assembly of FIG. 1, showing internal motor flow channels.
Figure 4:
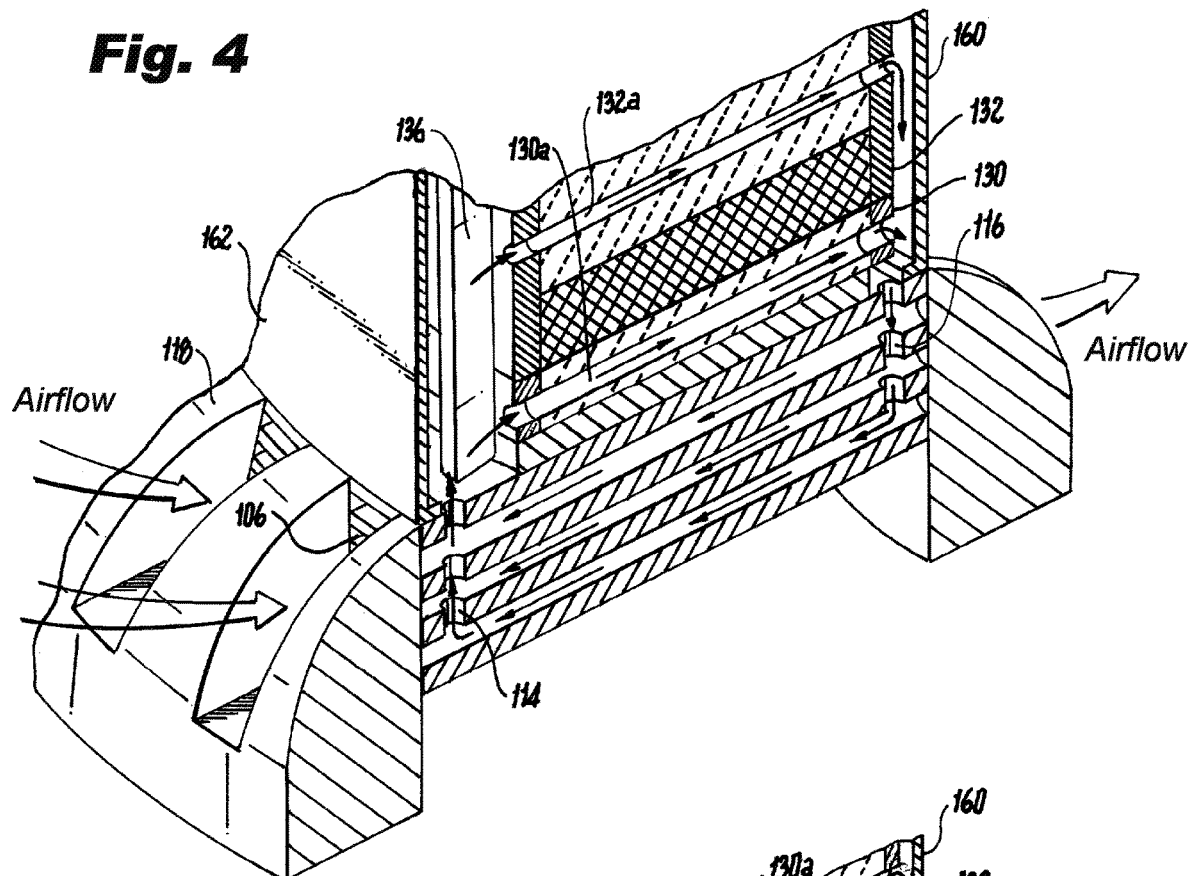
FIG. 4 is a perspective view of a portion of the assembly of FIG. 1, showing internal flow channels.

Referring again to FIG. 1, the fan motor housing assembly includes a motor including a stator 130 located radially inward from the inner surface 110 of the motor housing and a rotor 132 located radially inward from the stator 130 and a shaft 134 located radially inward from the rotor 132. The stator 130 is entirely surrounded by the motor housing 102. An impeller 136 can also be located within the motor housing 102. The impeller 136, located forward of the motor 130/132, and aft of the outlets of the first plurality of conduits 114 is sealed within the housing 102 by seal plate 162, is used for creating a pressure difference and drawing the cooling fluid from the second plurality of flow channels 112 into the stator 130 and rotor 132. The flow paths 130a and 132a for the cooling fluid within the stator 130 and rotor 132 are shown in FIG. 3. Alternatively, it is also considered that the rotation of the rotor 132 can create enough suction to force the fluid into the hottest portions of the motor in order to cool it. A circumferential channel 138 (as shown in FIG. 4) can also separate the stator 130 and the inner surface 110 of the motor housing. The channel 138 allows for cooling an outer portion of the stator 130. In this embodiment, the rear portion of the housing 126 is sealed in order to prevent the cooling fluid from leaking out. The geometry of the radial channels, and headers, allows for the housing to be manufactured using additive manufacturing processes. Conventional manufacturing methods typically do not allow for the intricate interconnections formed within the housing walls.

FIG. 3 shows a portion of the motor's stator 130 and rotor 132. The channels 130a and 132a provide fluidic access to the hottest inner portion of the motor. As fluid travels from the housing 102 it enters the channels 130a and 132a.

Figure 5:
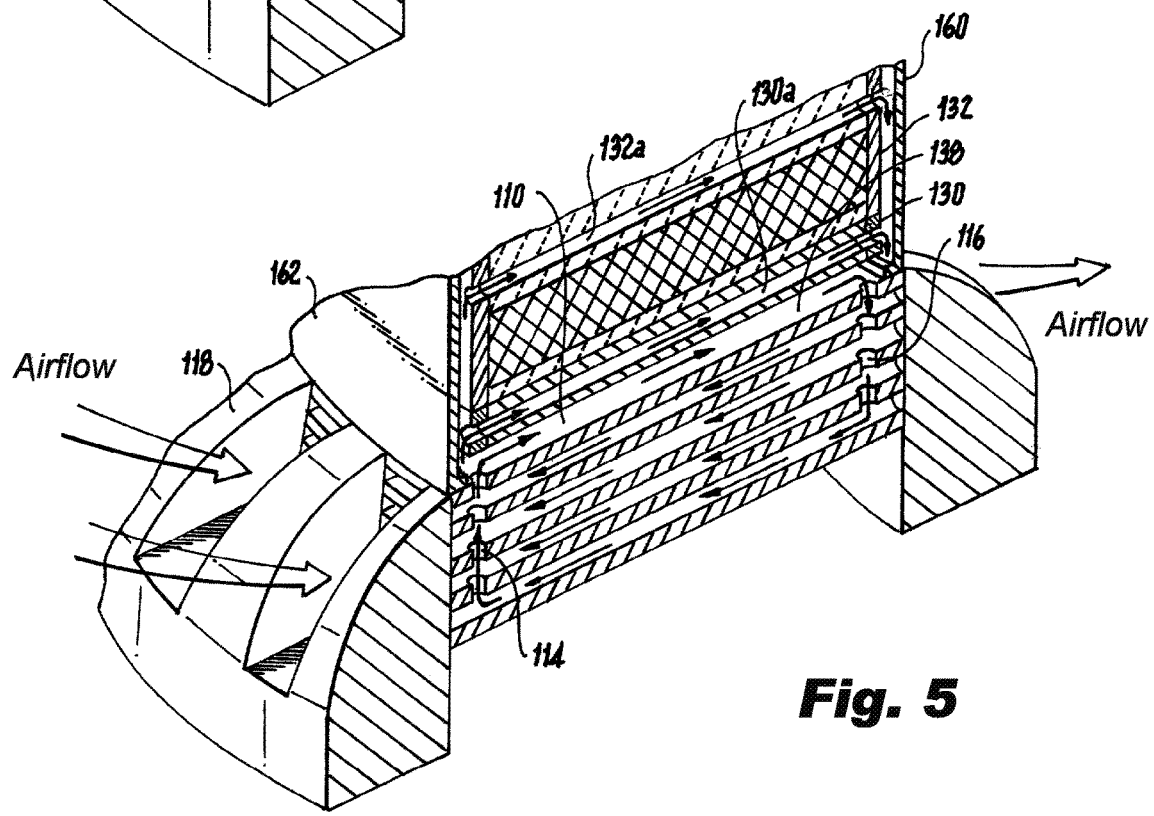
FIG. 5 is a perspective view of a portion of the assembly of FIG. 1, showing an embodiment of internal flow channels.

FIGS. 4 and 5 show the fluidic paths within the housing 102. As fluid is driven up by the rotational motion of the motor 130/132 (as shown and oriented in FIG. 4) or by the impeller 136, the fluid is pumped to the inlet portion 122 of the housing 102 through the second plurality of channels 112. The fluid can be suctioned to either the circumferential channel 138 (as shown in FIG. 5) and into the channels 130a and 132a, or strictly into the channels 130a and 132a (as shown in FIG. 4). The seal plates 162 and 160 prevent the cooling fluid from escaping the housing. The impeller 136 can provide the suction for the cooling fluid, as depicted in FIG. 4, it is also considered that the required suction can be provided using centripetal force of the rotor alone, as depicted in FIG. 5.

FIGS. 6 and 7 shows the front headers 118 separated from the rest of the housing 102, and exposing different arrangements of the second plurality of channels 112 and the parallel first axially extending channels 106.

A method of cooling the stator 130 and rotor 132 is also disclosed using two flow circuits. The first circuit includes a closed loop of a fluid within the motor housing 102, and a second circuit of air flowing through the housing 102 and thermodynamically interacting with the fluid. The method includes operating the electric motor 130/132 within the motor housing 102, driving a propeller 140 by the electric motor 130/132 and the common shaft 134, and driving propeller air through a first axially extending channel 106 within the motor housing 102. The method further includes driving a fluid through a second axially extending channel 112 within the motor housing 102. The fluid is cooled by a heat exchange with the air flowing through the first set of channels 106. The cooled fluid is driven from the first plurality of radially extended conduits 114 into a cavity 138. The fluid is then returned back to the second axially extending channels 112 through an inlet to the second plurality of radially extended conduits 114 aft of the stator 130 and the rotor 132. It is conceived that the cooling fluid can be air or a liquid such as oil.

The methods and systems of the present disclosure, as described above and shown in the drawings, provide for electrical power system with superior properties including increased reliability and stability, and reduced size, weight, complexity, and/or cost. While the apparatus and methods of the subject disclosure have been showing and described with reference to embodiments, those skilled in the art will readily appreciate that changes and/or modifications may be made thereto without departing from the spirit and score of the subject disclosure.

What is claimed is:

1. A fan motor housing comprising:
a circumferential motor housing having a radially outer surface and a radially inner surface and defining a primary axis, the radially inner surface defining a cavity; comprising:
a first plurality of concentric flow channels configured to port a first fluid therethrough disposed between the radially outer surface the radially inner surface, wherein the concentric flow channels extend in an axial direction parallel to the primary axis;
a second plurality of concentric flow channels configured to port a second fluid therethrough disposed between the radially outer surface and the radially inner surface, extending in an axial direction parallel to the primary axis, wherein the first and second respective pluralities of concentric respective flow channels are in thermal communication for heat exchange;
a first plurality of radial conduits connecting the second plurality of flow channels to the cavity configured to port the second fluid to a cavity; and
a second plurality of radial conduits connecting the cavity to the second plurality of flow channels configured to port the second fluid from the cavity to the second plurality of concentric flow channels, wherein in flow channels of the first plurality of concentric flow channels and flow channels of the second plurality of concentric flow channels are arranged alternatingly in a circumferential direction, and wherein in the flow channels of the first plurality of concentric flow channels and the flow channels of the second plurality of concentric flow channels are arranged alternatingly in a radial direction.

2. The fan motor housing assembly of claim 1, further comprising a plurality of circumferentially arranged headers sealing each of the channels of the second plurality of concentric channels.

3. The fan motor housing assembly of claim 2, wherein the plurality of circumferentially arranged headers include a transition section configured to reduce an incidence level of a transition from each of the headers to the first plurality of concentric flow channels.

4. The fan motor housing assembly of claim 2, wherein the plurality of circumferentially arranged headers are located proximate to an inlet side of the motor housing.

5. The fan motor housing assembly of claim 4, further comprising a second plurality of circumferentially arranged headers located proximate to an outlet side of the motor housing.

6. The fan motor housing assembly of claim 1, further comprising:
a stator located radially inward from the inner surface of the motor housing;
a rotor located radially inward from the stator; and
a shaft located radially inward from the rotor.

7. The fan motor housing assembly of claim 6, further comprising an impeller located within the motor housing configured for drawing the cooling fluid from the second plurality of concentric flow channels.

8. The fan motor housing assembly of claim 7, wherein the stator and impeller are completely within the circumferential motor housing.

9. The fan motor housing assembly of claim 7, wherein a circumferential channel separates the stator and an inner surface of the motor housing.

10. A method of cooling a fan motor comprising:
operating an electric motor within a motor housing;
driving a propeller by the electric motor;
driving propeller air through a first axially extending channel within the motor housing;
driving a fluid at least partially through a second axially extending channel within the motor housing wherein the motor housing includes:
a first plurality of concentric flow channels configured to port a first fluid therethrough disposed between the radially outer surface the radially inner surface, wherein the concentric flow channels extend in an axial direction parallel to the primary axis;
a second plurality of concentric flow channels configured to port a second fluid therethrough disposed between the radially outer surface and the radially inner surface, extending in an axial direction parallel to the primary axis, wherein the first and second pluralities of concentric flow channel are in thermal communication for heat exchange;
a first plurality of radial conduits connecting the second plurality of flow channels to the cavity configured to port the second fluid to the cavity; and
a second plurality of radial conduits connecting the cavity to the second plurality of flow channels configured to port the second fluid from the cavity to the second plurality of concentric flow channels, wherein in the flow channels of the first plurality of concentric flow channels and the flow channels of the second plurality of concentric flow channels are arranged alternatingly in a circumferential direction, and wherein in the flow channels of the first plurality of concentric flow channels and the flow channels of the second plurality of concentric flow channels are arranged alternatingly in a radial direction;
cooling the fluid by heat exchange with the air within the first axially extending channel;
returning the fluid from the second axially extending channel into a cavity defined by an inner surface of the motor housing to cool components contained therein; and
driving the fluid from the cavity to the second axially extending channel.

11. The method of claim 10, further comprising driving an impeller by the electric motor to draw the fluid from the second circumferential channel to an inner surface of the motor housing.

12. The method of claim 10, wherein the fluid is air.

13. The method of claim 10, wherein the fluid is oil.

* * * * *